United States Patent Office 3,473,435
Patented Oct. 21, 1969

3,473,435
VIBRATION CONTROLLER FOR MACHINE TOOLS
Francis S. Tse, Cincinnati, Ohio, and Theodore R. Comstock, South Fort Mitchell, Ky., assignors of one-third to Jason R. Lemon, Milford, Ohio
Filed Apr. 26, 1967, Ser. No. 633,874
Int. Cl. B23c 1/00, 7/00, 9/00
U.S. Cl. 90—11                        18 Claims

ABSTRACT OF THE DISCLOSURE

A vibration controller is disclosed useful with machine tools for eliminating vibrations of the tool and/or workpiece and thereby improving the cutting process without resort to massive machine tool structures. The vibration controller includes a transducer for continuously monitoring the interface of the tool cutting surface and the workpiece to generate an output signal correlated to the actual depth of the cutting tool relative to the workpiece, a circuit for generating a control signal correlated to the difference between a desired and the actual depth of cut, and a servomechanism interposed between the cutting tool and the base of the machine which is responsive to the control signal for instantaneously shifting the position of the tool and workpiece relative to each other as is necessary to maintain the desired interface condition, that is, the desired depth of cut thereby eliminating vibratory relative motion between the tool and workpiece at their interface.

---

This invention relates to machine tools, and more particularly to a vibration controller for reducing vibratory motion of a cutting tool relative to a workpiece.

The reduction of vibration in machine tools, regardless of its source, is a well recognized machine tool design principle, and has been for many years. It is fundamental that the characteristics of any cutting process depend on the nature of the relative motion between the workpiece and cutting tool. Otherwise stated, it is the interaction of the cutting tool and the workpiece at their interface that determines the quality of the stock removal process. It is equally well known that when vibratory motion exists between the cutting tool and the workpiece, the surface finish deteriorates, dimensional accuracy is reduced, the stock removal rate decrease, and the cutting tool quickly dulls.

Machine tool builders go to great extremes, involving tremendous expense, to hold vibrations to a minimum. Their solutions have taken two approaches. Some are predicated on the principle of isolating the cutting tool from vibrations, and seek to accomplish this by employing very elaborate and sophisticated vibration dampeners at variouse points throughout the machine tool. For example, in accordance with one such proposal, the cutting tool is held in a tool holder which is mounted to the machine tool frame by a resilient spring arrangement. In accordance with other prior art schemes, it is the workpiece that is resiliently mounted, or the machine tool frame itself.

The problem with the vibration isolation approach is that at best it represents only a compromise between the need for stiff springs to minimize tool deflection and, hence, maintain dimensional accuracy, and the need for soft springs to absorb more vibration and thereby improve the cutting process. Without elaborating, it can be fairly stated that this approach has not met with much success as is clearly evidenced by its failure to achieve widespread adoption.

The other principal approach to the vibration problem, which is aptly termed a "brute force" technique, relies on the use of massive structural elements for supporting the cutting tool in a manner such that tool deflection under the action of vibration-inducing forces is kept within tolerable limits. As anyone who has ever seen a production machine tool such as a lathe or milling machine knows, this brute force approach results in a machine tool having bases, columns, and beds which are enormous proportions. This heavy duty construction has been found to be a necessary design expedient in accordance with present day thinking if tool deflection and, hence, relative vibratory motion between the cutting tool and workpiece are to be kept to acceptable levels. In fact, its acceptance has become so widespread that now it is practically a sine qua non in the machine tool field, and its validity as a design principle is hardly subject to question.

Unfortunately, the problem with this heavy duty construction approach, in addition to its staggering cost, is that it suffers from certain inherent limitations. Specifically, the capability of the conventional machine tool to control vibrations is limited by the inherent characteristics of its *passive* structure. A passive structure is inherently incapable of any positive action designed to accommodate or compensate for cutting tool vibrational disturbances which may exist. Such is the case regardless of whether the vibrations are of the self-excited or self-induced type commonly known as chatter, or of the forced type which result when vibrations from an external source such as a passing truck or adjacent machine are transmitted to the cutting tool by the machine frame itself.

A conventional machine tool can only attempt to prevent tool vibrations from ever occurring in the first instance, and this it does by making the frame so massive that the tool moves or deflects only very slightly even when subjected to tremendous vibration-inducing forces. If tool vibrations are prevented from occurring, or kept to a tolerable minimum level, for all intents they obviously never effectively exist and, consequently, the machine tool need not provide accommodation or compensation. However, this prevention can only be attempted by resort to massive machine tool structures which can withstand ordinary vibration-inducing forces without deflecting. But there is a practical limit to the size a machine tool can have, and this limit is fast approaching as today's production rates and requirements for surface finish continue rising at an ever increasing pace. Thus, the conventional machine tool will become increasingly less satisfactory as the demands on it multiply.

It has been a principal objective of this invention to develop a more satisfactory solution to the machine tool vibration problem, particularly one which does not require the massive structures characteristic of present day machines. This objective has been accomplished in accordance with the principles of this invention by utilizing a fundamentally different concept in machine tool design. In accordance with this concept, the passive structure of existing machines is replaced by an active structure or vibration controller which continuously monitors the relative position between the tool and workpiece, or the depth of cut, and shifts the position of the tool and workpiece relative to each other at a rate and in a sense which exactly matches or complements that at which the tool and/or workpiece may be vibrating at any given instant. This complementary shifting of the tool and workpiece relative to each other continues only so long as is necessary to restore the depth of cut to the desired level. In the case of tool vibrations which are forced, the complementary tool shifting motion would continue as long as the external source continued to transmit vibrations to the tool. If the tool vibrations are due to chatter, that is, self-induced, the complementary tool shifting would continue no more than is necessary to dampen the tool vibration to an insignificant level, which may be on the order of a few cycles.

In one form of the invention a desired position of the cutting tool from a datum, for example, the desired depth of cut on a rotating workpiece is selected. A probe continuously detects any displacement from the preselected position, and, through appropriate circuitry and a servomechanism interposed between the tool and the base of the machine, causes the tool to be returned to its preselected position.

It can be appreciated that with this concept massive support or base structures are not required to hold the tool in proper position. When a tool begins to move from a preselected position, that movement is detected and instantaneously the servomechanism applies a corrective force to return the tool to the preselected position. When a large application of force is required a massive base is not necessary to resist it; rather a light base can resist it simply by deflecting to a greater extent than a massive structure would.

More specifically in this form of the invention the active structure or vibration controller includes a tool positioner embodying a hydraulic servovalve and actuator which shifts the position of the tool relative to the workpiece in response to position correction signals generated by continuously monitoring the workpiece-tool interface and comparing the desired position of the tool relative to the workpiece with their actual positions relative to each other. In this preferred embodiment the output signal of a position transducer mounted for movement with the tool is compared in a differential amplifier with a reference signal correlated to the desired depth of cut. The output generated by the differential amplifier is correlated to the instantaneous difference between the actual and desired depths of cut, and constitutes the continuously generated position correction signal for driving the tool positioner. This continuous process of monitoring the workpiece-tool interface and comparing the actual depth of cut against the desired depth of cut makes it possible to instantaneously alter the cutting tool position as is necessary to compensate for vibratory motion between the tool and workpiece, producing enhanced surface finish, accuracy, tool wear, and removal rate characteristics without resort to massive and heavy duty machine construction.

The function and operation of the vibration controller of this invention and the tool positioner embodied therein is not to be confused with existing numerical and/or adaptive control machine tools. In general, numerically controlled machine tools locate the initial position of the tool relative to the work and select speeds and feeds according to some predetermined and inflexible stored plan or program. Adaptive control theory, in summary, functions to optimize machining time, cost, profit or some other selected index of performance by adjusting the feed and/or speed during a machining operation in accordance with tool sharpness, stock hardness, tool and work temperature, etc. Neither the adaptive nor the numerical control machine tools attempt to monitor the relative motion between the cutting tool and workpiece at the interface and in response thereto continuously shift the position of the cutting tool and workpiece relative to each other at a rate and in a sense such that relative vibratory motion between the cutting tool and workpiece at their interface is minimized.

It has been a further and equally important objective of this invention to provide a hydraulic tool positioner in which a substantially linear relationship exists between the electrical position correcting signal input thereto and the mechanical tool positioning motion output therefrom. In accordance with certain additional principles of this invention, this objective has been accomplished in a very unique and unobvious manner which results in a two stage tool positioning operation.

More specifically, this objective has been achieved by separating the high frequency or dynamic portion of the differential amplifier output from the low frequency or steady state component thereof. The separated correction signals are then used to control two separate servovalves which are in hydraulic circuit arrangement with the actuator of the tool positioner, resulting in a two stage correction. The two stage correction, by separating the steady state and dynamic corrections, enables the dynamic servovalve to operate about an equilibrium position which is not offset from a zero or reference position by an amount corresponding to the steady state correction. With the equilibrium position so referenced, the dynamic servovalve operates in a region free of flow degradation and consequent nonlinearities.

Other objectives and advantages of this invention will be more readily apparent from a detailed description of the invention taken in conjunction with the accompanying drawings in which.

Figure 1:
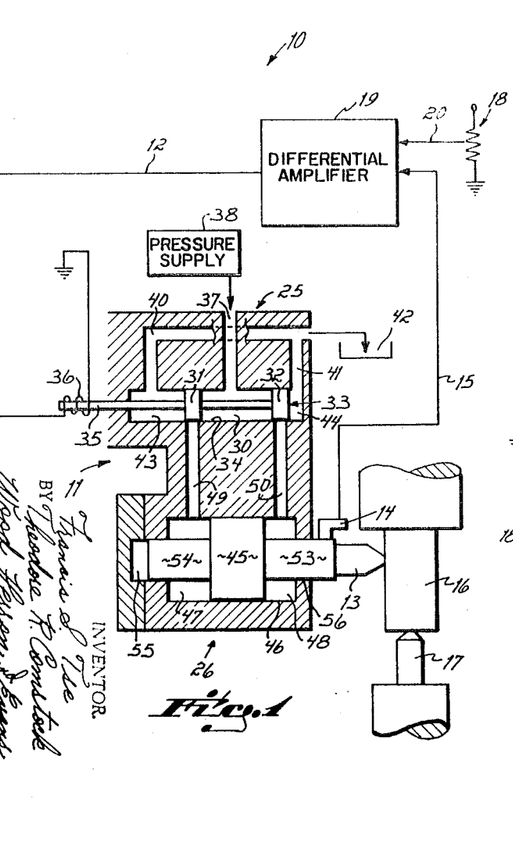
FIGURE 1 shows, in conjunction with a lathe, a first preferred embodiment of a machine tool vibration controller constructed in accordance with the principles of this invention.

One preferred embodiment of the vibration controller of this invention is depicted in FIGURE 1. This embodiment, as an aid to understanding its operation and advantages, is shown in connection with its use in a particular machine tool environment, namely, in connection with a machine tool of the lathe type. As those skilled in the art will immediately appreciate and as will be evident hereafter, the vibration controller of this invention is not limited to applications in machine tools of only the lathe type, but rather finds substantial utility in other machining environments where a tool operates on a workpiece to remove material as occurs, for example, in milling, grinding, etc.

As shown in FIGURE 1, the vibration controller in one form includes a closed loop servo feedback network, which is indicated generally by the reference numeral 10, having as one of its principal components a tool positioner 11. The tool positioner 11 mounts a tool 13 proximate a workpiece 16 rotatably mounted on centers 17. The tool positioner 11 controls the axial position of the tool 13 in response to a continuously generated position correction signal input on line 12. To generate the position correction signal, the feedback network 10 is further provided with a position transducer 14, a source of variable reference potential 18, and a differential amplifier 19. The position transducer 14 is mounted for movement with the tool 13, and provides a tool position signal on line 15 correlated to the instantaneous actual depth of cut being made by the tool 13 relative to the workpiece 16. The source of variable reference potential 18 produces a signal on line 20 correlated to the desired depth of cut to be made by the tool 13 in the workpiece 16. The differential amplifier 19 responds to the desired and actual depth of cut signals on lines 20 and 15, respectively, and continuously generates a position correction signal on line 12 representing the instantaneous difference between the desired and actual depths of cut between the tool 13 and the workpiece 16.

In operation, the reference potential source 18 is adjusted to produce on line 20 a signal correlated to the desired depth of cut to be made by the tool 13 in the workpiece 16. The signal on line 20 is input to the differential amplifier 19 where it is compared with the signal on line 15 generated by the position transducer 14 corresponding to the instantaneous actual depth of cut. Should there be a difference between the signals on lines 15 and 20 due to the tool 13 being located at a position other than that corresponding to the desired depth of cut setting of source 18, as occurs when vibrations are present, the differential amplifier 19 generates an error or position correction signal on line 12. The position correction signal on line 12 is input to the tool positioner 11, advancing or retracting the tool 13 as required to return the tool cutting surface to a position where the actual depth of cut and the desired depth of cut are equal. When the tool 13 has been properly repositioned, the actual depth of cut signal on line 15 output from the transducer 14 equals the desired depth of cut signal on line 20 output from the reference potential source 18, producing a zero error or position correction signal on line 12 which prevents further positioning of tool 13 from occurring.

The speed at which the tool 13 must be repositioned to restore the depth of cut determines the required frequency response of the tool positioner, and depends upon the frequency at which the workpiece 16 and/or tool 13 are vibrating. This latter frequency is subject to variation depending on whether the vibrations are self-induced or externally generated. If the vibrations are self-induced, the frequency is a function of the various vibrational resonant frequencies of the machine structure and typically range from 200 c.p.s. to 1,000 c.p.s. If the vibrations are forced, that is, externally produced, the vibration frequency is a function of the frequency of the external source which may vary over a wide range.

The vibration controller of this invention, without resort to massive structures, accommodates the vibration-inducing forces of a typical machining operation, maintaining the instantaneous depth of cut at the desired value and producing a cutting process free of the defects normally associated with tool vibration. The manner in which this is done is best illustrated by first considering the action of a conventional machine tool when subjected to a vibration-inducing force.

Figure 6A:
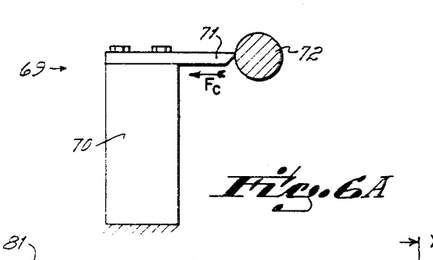
Figure 6B:
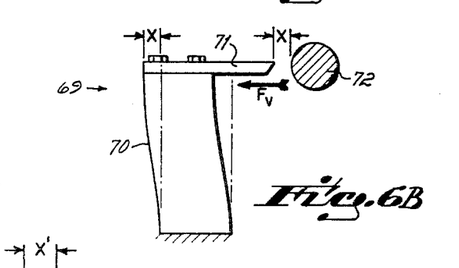

Referring to FIGURES 6a and 6b, a conventional machine tool 69 is shown having a massive tool support structure represented schematically by the reference numeral 70 which rigidly positions a tool 71 relative to a workpiece 72 mounted on centers (not shown). FIGURE 6a depicts the tool 71 and support 70 under cutting conditions in which a vibration-inducing force is not present. Ignoring tangential forces, in this condition, a relatively small cutting force $F_c$ is present which acts on the tool 71 in a direction along the tool axis. This force $F_c$ deflects the tool support 70 an insignificant amount which, for the purpose of clarity, is not shown.

In FIGURE 6b, the same machine tool 69 is shown subjected to a large vibration-inducing force $F_v$. Under the action of force $F_v$, the machine tool support 70 deflects, instantaneously withdrawing the tool 71 from the workpiece 72 a distance X, thereby momentarily decreasing the depth of cut and producing an imperfection in the surface finish. Were it not for the massive tool support 70, the tool deflection produced by the force $F_v$ would be even larger.

Figure 7A:
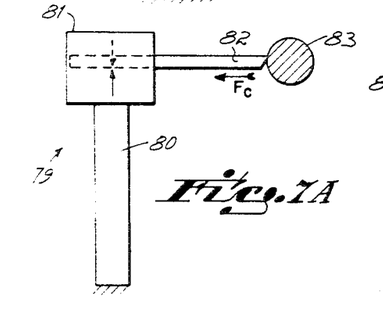
FIGURES 7a and 7b show schematically the response to a vibration-inducing force of a machine tool incorporating the vibration controller of this invention.

Referring to FIGURE 7a a machine tool 79 is shown modified to incorporate the principles of this invention. Machine tool 79 is characterized by having a tool support 80 of much smaller proportions than the support 70 of the conventional machine. Mounted on the support 80 is a vibration controller 81 which has extending from it a cuting tool 82 in cutting relation to a workpiece 83. The workpiece 83 exerts a force $F_c$ on the tool 82, and, hence, on the support 80, producing negligible deflection (not shown).

Figure 7B:
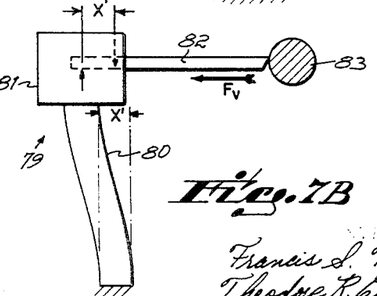

FIGURE 7b depicts the machine tool of FIGURE 7a subjected to an instantaneous and relatively large vibration-inducing force $F_v$. The force $F_v$ deflects the tool support 80 and vibration controller 81 an amount X'. However, the tool cutting surface does not move away from the workpiece 83 to instantaneously decrease the depth of cut, as in the conventional machine tool of FIGURE 6b. Rather, the tool 82 is shifted a distance X' relative to the machine tool support 80 and vibration controller 81 at a rate and in a sense which exactly complement or match the deflection of the machine tool support 80 and vibration controller 81. Thus, the position of tool 82 relative to the workpiece 83 remains constant.

Of course, it will be understood that in practice the tool 82 does, in fact, move some finite amount relative to the workpiece 83 under the action of the force $F_v$. Such movement, however, is kept to a very minute and insignificant level. As soon as the position transducer, which monitors the tool-workpiece interface, detects any relative motion between the tool and workpiece, a position correction signal is generated and the relative motion arrested and the tool repositioned, re-establishing the depth of cut to the desired level. Thus, the vibration controller 81 prevents the force $F_v$ from varying the depth of cut from the desired level for either an extended period of time or a significant amount.

It is noted that should the normal cutting force $F_c$, that is, the force on the tool absent vibration-inducing forces, be sufficiently large to appreciably deflect the tool support 80, the vibration controller 81 responds in the same manner as described with respect to vibration-induced deflections to restore the depth of cut to the desired level. Specifically, the position transducer senses the disparity between the desired depth of cut and the actual depth of cut due to the deflection caused by the cutting force $F_c$. A position correction signal is generated, and the tool position shifted as required to reposition the tool to the desired depth of cut.

The tool positioner 11, which positions the tool 13 for taking the desired depth of cut relative to the workpiece 16, may take a number of different forms. In one preferred form shown in FIGURE 1, the tool positioner 11 includes a hydraulic spool valve 25 and an actuator 26. The valve 25 includes a spool 33 snugly fitting and axially shiftable within a bore 34 by a shaft 35 which constitutes the output of an electromechanical transducer 36. The electromechanical transducer may be of any suitable type which provides a mechanical output in response to an electrical input. The spool 33 has a pair of lands 31 and 32. An inlet pressure fluid passage 37 interconnects a source of fluid pressure 38 and the portion 30 of the bore 34 located between the lands 31 and 32. Drain passages 40 and 41, respectively, connect the chambers 43 and 44 formed by the extremities of the bore 34 and lands 31 and 32 to a tank 42. In practice the spool valve 25 and electromechanical transducer 36 are fabricated integrally and marketed as a unit commonly termed a servovalve. Servovalves suitable for use in the tool positioner of this invention are marketed by The Moog Valve Co. and are designated as Flow Control Valves, Series 30, Model 31–010A. Similar servovalves are marketed by Planet Products, Inc. of Cincinnati, Ohio.

The actuator 26 includes a piston 45 axially shiftable in a cylinder bore 46. The piston 45 divides the cylinder bore 46 into two variable volume chambers 47 and 48. The chambers 47 and 48 communicate with the bore 34 via passageways 49 and 50. Axially and rightwardly extending from the piston 45 is a shaft 53 which mounts the tool 13 and the transducer 14. Extending from the piston 45 in a direction opposite to that of the shaft 53 is a shaft 54. The shafts 53 and 54 slide and seat respectively in a blind hole 55 and in a through hole 56, thereby radially positioning and supporting the shafts 53 and 54 and, hence, the piston 45, tool 13, and transducer 14.

The passages 49 and 50 are located relative to the chambers 47 and 48 such that during a normal tool positioning operation the piston 45 does not seal either of the passages 47 and 48. The passages 49 and 50 are located relative to the bore 34 and the lands 31 and 32 such that when the spool 33 is positioned in the centered position shown in FIGURE 1, the lands 31 and 32 seal passages 49 and 50, isolating the chambers 47 and 48 from the high pressure line 37. Additionally, the location is such that when the spool 33 is positioned to the left of center, the chamber 47 communicates with the high pressure inlet passage 37 via passage 49 and the chamber 48 communicates with the tank drain line 41 via passage 50. Finally, the positioning is such that when the spool 33 is located to the right of center, the chamber 48 communicates with the high pressure inlet passage 37 via passage 50, while the chamber 47 communicates with the tank drain line 40 via passage 49.

If it is desired to produce and maintain a depth of cut X in the workpiece 16, the reference potential source 18 is adjusted such that a voltage is produced on line 20 correlated to the desired depth of cut X. The signal on line 20 is compared by the differential amplifier 19 with the signal on line 15 correlated to the actual depth of cut provided by the tool 13 in its present position. Should the two signals be the same, as occurs for example, when the instantaneous actual depth of cut equals the desired depth of cut X, and there are no tool and/or workpiece vibrations, the differential amplifier output on line 12 is zero. With a zero position correction signal input to the electro-mechanical transducer 36, the shaft 35 and, hence, the spool 33 remain stationary, centering the lands 31 and 32 and sealing the passages 49 and 50. The sealed condition of passages 49 and 50 confines the fluid in chambers 47 and 48, maintaining the piston in its then present position and, hence, the tool 13 at the desired depth of cut X.

Should, at any instant, the tool be at a position other than that corresponding to the desired depth of cut X as occurs, for example, when the tool 13 and/or workpiece 16 are vibrating, there is an instantaneous difference between the actual and desired depth of cut signals on lines 15 and 20, respectively. This instantaneous difference causes a position correction signal to be generated on line 12 by the differential amplifier 19 which, when input to the electromechanical transducer 36 of the tool positioner 11, causes the shaft 35 to move the spool 33 either to the right or to the left depending on whether proper positioning of the tool 13 relative to the workpiece 16 to obtain the desired depth of cut requires the tools to be advanced leftwardly or rightwardly.

For example, if the instantaneous position of the tool 13 is such that the depth of cut is less than the desired depth X the error signal produced by the differential amplifier 19 operates the electromechanical transducer 36 in a manner such that the shaft 35 shifts the spool 33 to the left carrying with it lands 31 and 32. As land 31 moves leftwardly, the high pressure fluid source 38 is connected to the chamber 47 via inlet passage 37, bore portion 30, and passage 49. At the same time, the leftward movement of the land 32 unseals the passage 50, connecting the chamber 48 with tank 42 via passage 50 and drain line 41. The combined action of connecting chamber 47 with the high pressure fluid source 38 and the chamber 48 with the tank 42 functions to simultaneously admit fluid into chamber 47 and drain fluid from the chamber 48. This in turn causes the piston 45 and, hence, the shaft 53 and tool 13 to move rightwardly, increasing the depth of cut. Rightward movement of the piston 45 continues until the tool 13 has moved sufficiently into the workpiece 16 to establish the desired depth of cut X.

When the depth of cut X is achieved, the signal from the transducer 14 on line 15 equals the signal on line 20 from the reference potential source 18, causing the position correction signal output on line 12 from the differential amplifier 19 to be zero. This zero correction signal, in turn, causes the electromechanical transducer 36, via its shaft 35, to return the spool 33 to its center position, locating the lands 31 and 32 in sealing relationship with the passages 49 and 50. With passages 49 and 50 blocked, the chambers 47 and 48 are effectively sealed, maintaining the volume of fluid trapped in chambers 47 and 48 on each side of the piston 45 and, hence, precluding the shaft 53 and tool 13 from axially shifting to alter the desired depth of cut X.

Should the instantaneous depth of cut of the tool 13 relative to the workpiece 16 be greater than the preselected depth of cut X due, for example, to vibrations of the workpiece 16 and/or tool 13, the error signal is produced by the differential amplifier 19 which when input to the electromechanical transducer 36, operates it in a manner such that the spool 33 moves to the right, carrying with it lands 31 and 32. Rightward movement of the land 32 connects the high pressure fluid source 38 to the chamber 48 via inlet passage 37, bore portion 30, and passage 50. Simultaneously, rightward movement of the land 31 connects the chamber 47 to the tank 42 via the drain line 40 and the passage 49. With the chambers 48 and 47 so connected, fluid enters and leaves, respectively, chambers 48 and 47, causing the piston 45, and hence, the shaft 53 and tool 13 to move leftwardly, decreasing the depth of cut. Leftward movement continues until the desired depth of cut X is achieved.

When the depth of cut is re-established at the desired value X, the signals on lines 15 and 20 from the transducer 14 and reference source 18 match, reducing the error signal on line 12 to zero. This prevents further tool motion in the manner described previously.

As those skilled in the feedback art will appreciate, the differential amplifier output on line 12 does not actually reach zero when the tool 13 is positioned to the desired depth of cut, but rather approaches a small valve near zero. The exact value of the ouput of the differential amplifier 19 at this "zero" point depends on the open loop gain of the feedback network, becoming smaller and larger as the open loop gain is increased or decreased, respectively.

Figure 2:
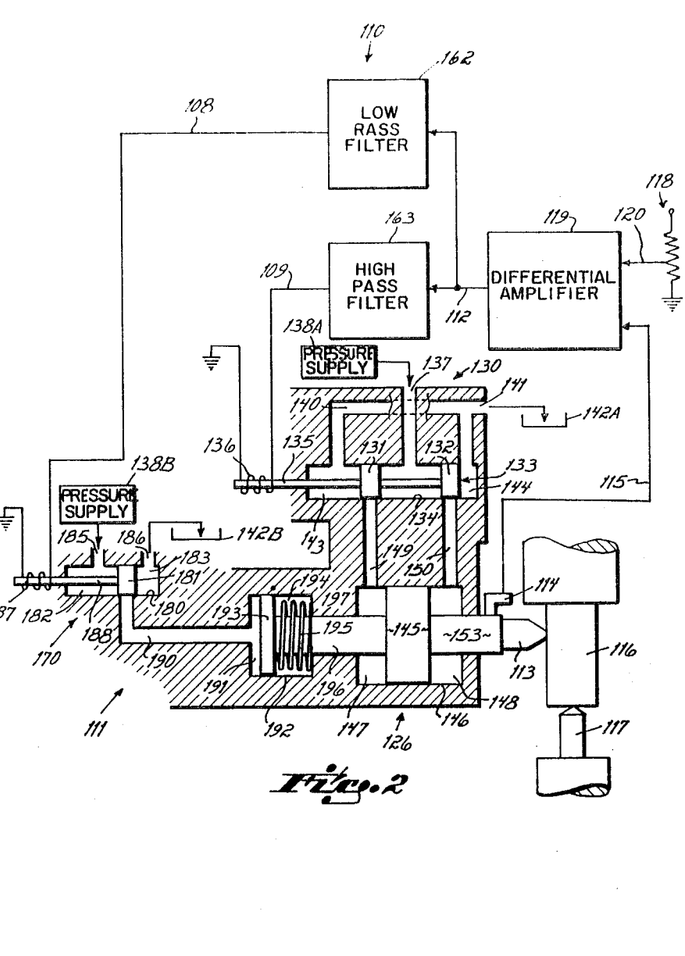
FIGURE 2 shows, also in conjunction with a lathe, a second preferred embodiment of a machine tool vibration controller having the two stage correction feature.
Figure 3A:
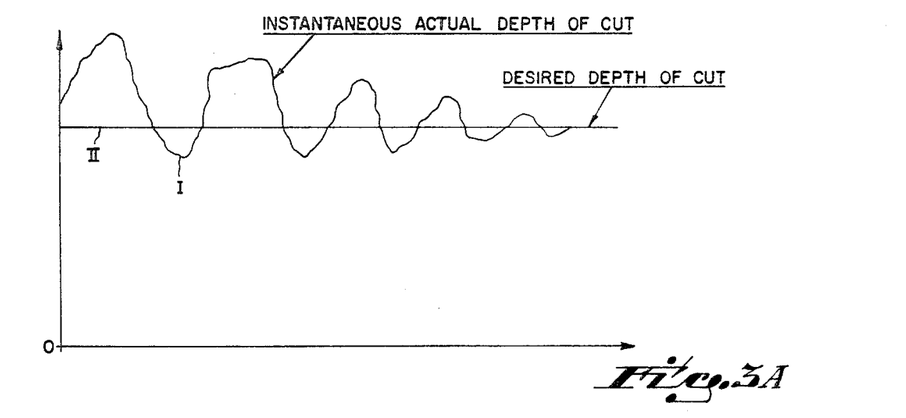
FIGURES 3a–3c show plots of the actual and desired depths of cut versus time, as well as plots of certain related parameters with respect to time, which are useful in understanding the operation and advantages of the various embodiments of this invention.

In a second preferred embodiment of this invention, a closed loop servo feedback network 110 is provided having as one of its principal elements, a tool positioner 111. The tool positioner 111 axially positions a cutting tool 113 relative to a workpiece 116 rotatably mounted on centers 117 in response to steady state control or correction signals on line 108 and dynamic control or correction signals on line 109. The closed loop servo feedback network 110 also includes a position transducer 114 which provides an output on line 115 correlated to the instantaneous depth of cut of the tool 113 relative to the workpiece 116. As those skilled in the art will appreciate, the actual depth of cut of the tool 113 relative to the workpiece 116 is continuously varying due to such things as vibration and the like, as depicted by plot I of actual depth of cut versus time shown in FIGURE 3a. Further included is a reference potential source 118 for providing an output signal on line 120 correlated to a desired depth of cut for the tool 113 relative to the workpiece 116. A plot II of the desired depth of cut versus time is depicted in FIGURE 3a.

Figure 3B:
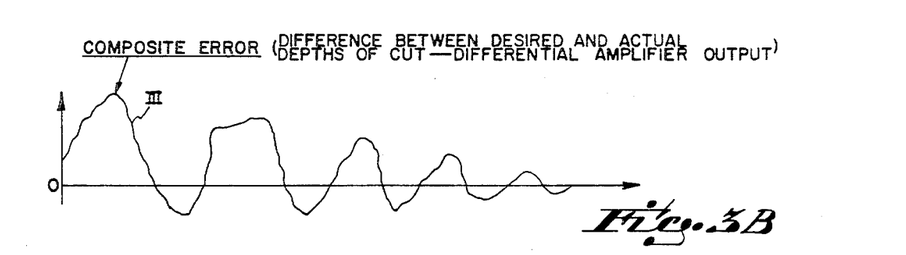

A differential amplifier 119 is responsive to the signals on lines 115 and 120 corresponding to the actual and desired depths of cut between the tool 113 and the workpiece 116. The differential amplifier 119 produces a composite error signal output on line 112 correlated to the difference between the signals on lines 115 and 120 and, hence, to the difference between the actual and desired depths of cut between the tool 113 and the workpiece 116. A plot III of this instantaneous difference between the actual and desired depths of cut is depicted in FIGURE 3b.

Figure 3C:
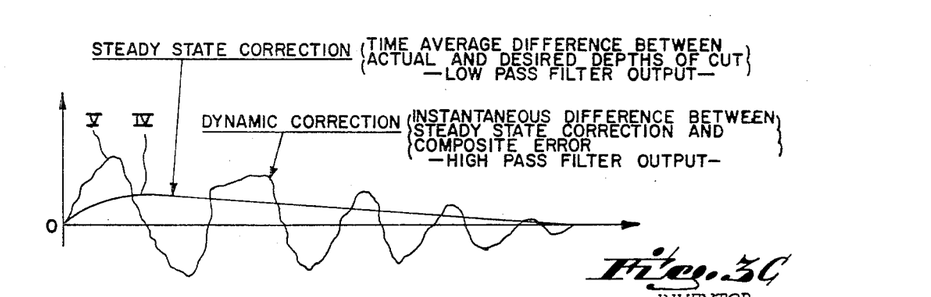

A low pass filter 162 and a high pass filter 163 are responsive to the composite error signal on line 112 and provide on lines 108 and 109 steady state and dynamic correction or control signals, respectively. The steady state correction signal on line 108 is correlated to the low frequency component of the composite error signal on line 112 which herein is defined as the time average difference between the desired and actual depths of cut between the tool 113 and the workpiece 116. A plot IV of this time average difference versus time is shown in FIGURE 3c. The dynamic correction signal on line 109 is correlated to the high frequency portion of the composite error signal on line 112 and, hence, represents the instantaneous deviation between (a) the time average difference between the actual and desired depths of cut (plot IV, FIGURE 3c) and (b) the instantaneous difference between the actual and desired depths of cut (plot III). A plot V of the dynamic correction signal is shown in FIGURE 3c.

In operation, the reference potential source 118 is adjusted to provide on line 120 a signal proportional to the desired depth of cut between the tool 113 and the workpiece 116. This signal on line 120 is then compared in the differential amplifier 119 with the signal on line 115 from the transducer 114 corresponding to the instantaneous actual depth of cut between the tool 113 and the workpiece 116. The differential amplifier 119 produces on line 112 a composite error signal proportional to the instantaneous difference between the actual and desired depths of cut between the tool 113 and the workpiece 116, the instantaneous difference being the result of vibration of the workpiece and/or tool. The high pass filter 163 extracts the high frequency component of the composite error signal on line 112, providing on line 109 a dynamic correction signal. The low pass filter 162 extracts from the composite error signal on line 112 the low frequency component producing on line 108 a steady state correction signal.

The steady state and dynamic correction signal on lines 108 and 109 are input to the tool positioner 111, repositioning the tool 113 relative to the workpiece 116 as required to establish the instantaneous depth of cut between the tool 113 and the workpiece 116 at the value corresponding to the desired depth of cut set by the reference potential source 118. Thus, the tool 113 is continuously maintained at the desired depth of cut notwithstanding vibrations of the tool and/or workpiece.

The tool positioning device 111, while it may take many forms, preferably includes an actuator 126, a dynamic fluid valve 130 and a steady state fluid valve 170. The fluid valve 130 selectively interconnects a source of pressure fluid 138A and a tank 142A with the actuator 126, and provides dynamic positioning of the tool 113 relative to the workpiece 116 in response to the dynamic correction signals on line 109. The fluid valve 170 selectively interconnects a source of pressure fluid 138B and a tank 142B with the actuator 126, and provides steady state positioning of the tool 113 relative to the workpiece 116 in response to steady state correction signals input to the valve 170 on line 108.

The valve 130 includes a spool 133 selectively axially shiftable in a bore 134. The spool 133 has a pair of spaced lands 131 and 132. A passage 137 connects the high pressure fluid source 138A with the portion of the bore 134 located intermediate the lands 131 and 132. The extremities 143 and 144 of the bore 134 communicate with a tank 142A via drain passages 140 and 141, respectively. An electromechanical transducer 136 is responsive to the dynamic control signals on line 109 and, via an output shaft 135 connected to the spool 133, axially positions the spool 133 within the bore 134. The transducer 136 may be of any suitable construction capable of positioning the shaft 135 in response to electrical signals.

The actuator 126 includes a cylinder bore 146 within which is positioned an axially shiftable piston 145. The piston 145 divides the bore 146 into variable volume chambers 147 and 148 which communicate via passages 149 and 150 with the bore 134. A shaft 153 extends axially from one side of the piston 145 through the cylinder wall and supports at the end thereof the tool 113 and the transducer 114.

The passages 149 and 150 are positioned relative to the chambers 147 and 148 such that they do not become sealed by the piston 145 in the normal course of positioning the tool 113 relative to the workpiece 116. The lands 131 and 132 are positioned on the spool 133 such that the passages 149 and 150 are sealed when the spool 133 is centrally positioned as shown in FIGURE 2 in response to a zero dynamic correction signal input to the electromechanical device 136 on line 109. The passages 137, 140 and 141 are positioned such that when the spool 133 is shifted to the left of the centered position, as required to move the piston 145 and, hence, the shaft 153 and the tool 113 to the right thereby increasing the depth of cut, the source of pressure fluid 138A communicates with the chamber 147 via inlet passage 137, bore 134, and the passage 149, and the tank 142A communicates with the chamber 148 via the passage 150 and the drain line 141. The passages 140, 137 and 141 are further positioned such that when the spool 133 is shifted to the right of the centered position, as is necessary when it is desired to move the piston 145 and, hence, the shaft 153 and the tool 113 to the left thereby decreasing the depth of cut, the chamber 147 communicates with the tank 142A via the drain line 140 and the passage 149, and the chamber 148 communicates with the pressure fluid source 138A via the pressure inlet passage 137, the bore 134 and the passage 150.

In operation, dynamic positioning of the tool 113 relative to the workpiece 116 in a direction such as to increase the depth of cut is effected by shifting the spool 133 to the left of the centered position shown in FIGURE 2. Leftward movement of the spool 133 is produced under the action of shaft 135 of the electromechanical transducer 136 in response to a dynamic control signal input thereto from the high pass filter 163. With the spool 133 in the leftward position, the source of pressure fluid 138A is connected to the chamber 147 via passage 137, bore 134 and passage 149. Simultaneously, the tank 142A is connected to the chamber 148 via passage 150 and drain line 141. With the chambers 147 and 148 so connected, fluid enters the chamber 147 urging the piston 145 and, hence, the shaft 153 and tool 113 to the right, thereby increasing the depth of cut. As the piston 145 moves rightwardly, fluid drains from the chamber 148.

The piston 145 and tool 113 continue moving rightwardly until the deviation (plot V) of the time average and instantaneous difference between actual and desired depth of cut equals zero (plots III and IV). When this occurs, the dynamic correction signal input to the electromechanical transducer 136 on line 109 is zero returning the spool 133 to the centered position sealing the passages 149 and 150. With the passages 149 and 150 sealed, fluid is trapped in the chambers 147 and 148 preventing further dynamic positioning motion of the piston 145 and, hence, of the tool 113.

Dynamic positioning of the tool 113 relative to the workpiece 116 in a direction such as to decrease the depth of cut is effected by shifting the spool 133 to the right of the center position shown in FIGURE 2. The spool 133 is so shifted in response to dynamic control signals input to the electromechanical transducer from the high pass filter 163 which operate to shift the shaft 135 rightwardly. With the spool 133 shifted rightwardly, the chamber 148 is connected to the source of pressure fluid 138A via the inlet passage 137, bore 134 and the passage 150 while the chamber 147 is connected to tank 142A via passage 149 and drain line 140. With the chambers 147 and 148 connected in this manner, high pressure fluid enters the chamber 148 urging the piston 145 and, hence, the shaft 153 and tool 113 to the left. Leftward motion of the piston 145 causes fluid to drain from the chamber 147 to tank 142A.

Movement of tool 113 to the left in a direction such as to decrease the depth of cut continues until the deviation (plot V) between the time average and instantaneous difference between actual and desired depth of cut reaches zero (plots III and IV). When this occurs, the dynamic control signal on line 109 input to the electromechanical transducer 136 reaches zero returning the spool 133 to its centered position which seals passages 149 and 150. With these passages sealed, the fluid in chambers 147 and 148 is trapped preventing further dynamic positioning of the piston 145 and, hence, the tool 113.

The valve 170 includes a bore 180 within which is slidably positioned a single land spool 181. The left-hand portion 182 and the right-hand portion 183 of the bore 180 communicate respectively with a source of pressure fluid 138B via a passage 185 and a tank 142B via a passage 186. An electromechanical transducer 187 of suitable construction is responsive to the steady state correction signal on line 108 and is provided with an output shaft 188 connected to the single land spool 181 for imparting axial positioning motion thereto.

The actuator 126, in addition to the piston 145 which is axially shiftable in response to dynamic control signals, also includes a piston 193 which is axially slidable in a bore 192 in response to steady state control signals. The piston 193 divides the bore 192 into variable volume chambers 191 and 194. A passage 190 interconnects the chamber 191 with the bore 180. A shaft 196 passing through hole 197 connects the pistons 193 and 145. A compression spring 195 located in the chamber 194 biases the piston 193 leftwardly. This biasing motion is transmitted to the tool 113 via the shaft 196, piston 145 and shaft 153.

The dimensions of the single land spool 181 and the passages 185, 186 and 190 are such that when the single land spool 181 is in the centered position shown in FIGURE 2 in response to a zero steady state correction signal input to the electromechanical device 187 and land 181 seals the passage 190. Further, the passage locations and land dimensions are such that when the single land spool 181 is to the right of center, as is necessary to provide steady state positioning of the tool 113 to the right thereby increasing the depth of cut, the chamber 191 communicates with the fluid pressure source 138B via the passage 190 and the high pressure inlet passage 185. In addition, the dimensioning and positioning of passages 185, 186 and 190 and spool 181 are such that when the single land spool 181 is to the left of the centered position, as is necessary to provide steady state positioning of the tool 113 to the left thereby decreasing the depth of cut, the chamber 191 is interconnected with the tank 142B via passages 190 and 186.

In operation, steady state positioning of the tool 113 relative to the workpiece 116 in a direction such as to increase the depth of cut is effected by shifting the single land spool 181 to the right of the position shown in FIGURE 2. The spool is shifted to the right by the shaft 188 of the electromechanical transducer 187 in response to a steady state control signal on line 108 output from the low pass filter 162. Rightward movement of the spool 181 allows the high pressure fluid in passage 185 to act on the piston 193 via the passage 190. This compresses the spring 195, urging the piston 193 and, hence, the shaft 196, piston 145, shaft 153, and tool 113 rightwardly. Movement of the tool 113 rightwardly continues until the time average difference between the actual instantaneous and desired depths of cut reaches zero (plot IV). When this occurs, the input to the transducer 187 goes to zero and the spool 181 returns to its center position sealing passage 190. This traps fluid in the chamber 191 preventing further rightward steady state tool positioning motion.

Steady state positioning of the tool 113 so as to decrease the depth of cut is effected by shifting the single land spool 181 to the left of the centered position shown in FIGURE 2. The spool is shifted to the left by the shaft 188 of the electromechanical transducer 187 in response to a steady state control signal on line 108 output from the low pass filter 162. Leftward movement of the spool 181 interconnects the chamber 191 with the tank 142B via passages 190 and 186. Connection of the chamber 191 to tank 142B enables the fluid in this chamber to drain, thereby permitting the piston 193 to move leftwardly under the action of the spring 195. This leftward movement of the piston 193 is transmitted to the tool 113 via the shaft 196, the piston 145 and shaft 153, thereby decreasing the depth of cut.

Movement of the tool 113 leftwardly continues until the time average difference between the actual instantaneous and desired depths of cut reaches zero (plot IV). When this occurs, the input to the transducer 187 goes to zero and the spool 181 returns to its center position sealing passage 190. This traps fluid in the chamber 191 preventing further leftward steady state tool positioning motion.

The vibration controller of FIGURE 2 differs from the vibration controller of FIGURE 1 in that the actuator 126 of FIGURE 2 is responsive to both a steady state correction signal and a dynamic correction signal for re-establishing the depth of cut at the desired value, whereas, the actuator 26 of FIGURE 1 re-establishes the depth of cut at the desired level in response to a single error signal on line 12 containing both the dynamic and steady state error correction components. Thus, the feedback network 11 of FIGURE 1 prevents vibrations with a single step correction, whereas the feedback network 111 of FIGURE 2 reduces vibrations with a two step process.

The two stage correction embodied in the apparatus of FIGURE 2 provides certain advantages over the one stage correction embodied in the apparatus of FIGURE 1. Specifically, two stage correction produces less degradation in the flow characteristics of the spool value, particularly at high frequencies, than does one stage correction. With the degree of degradation of the flow characteristics of the two stage spool valve at a lower value than that of the one stage valve for any given frequency, greater linearity occurs in the operation of the tool positioner of FIGURE 2 as compared to that of FIGURE 1. By linearity in the operation of the tool positioner is meant the linearity in the relationship between the tool positioning motion produced by the tool positioner and the electrical signal input to the tool positioner.

In the system of FIGURE 1, wherein the valve 25 is responsive to a single electrical signal on line 12 containing both a steady state correction component and a dynamic correction component, the spool 33 in effecting its dynamic correction deviates about a zero or equilibrium position which is off center from the spool position shown in FIGURE 1. Specifically, the spool 33 in the course of producing a dynamic correction deviates about a zero or equilibrium position corresponding to the off center spool position established by the steady state correction signal. It has been discovered that when the dynamic spool equilibrium or zero position, that is, the equilibrium or zero position for spool motion produced in response to the dynamic component of an error signal, is off center from that shown in FIGURE 1, the flow characteristics of the valve are degraded. Such degradation causes non-linearities to develop in the dynamic correction portion of the feedback system, that is, in the relationship between dynamic tool positioning motion and the dynamic component of the correction signal.

In contrast, with the system of FIGURE 2 wherein separate valves 170 and 130 are provided for the steady state and dynamic positioning corrections, respectively, the spool 133 of the dynamic positioning valve 130 has a zero or equilibrium position which is not off-center, but rather is centered as shown in FIGURE 2. This results since the valve 130 provides only the dynamic correction, the valve 170 controlling the steady state correction. With the valve 130 correcting only on a dynamic basis, the spool 133 of tool positioner 111 has its zero or equilibrium position in the centered position depicted in FIGURE 2. Consequently, degradation of the flow characteristics and resultant non-linearity of operation characterizing the non-centered zero or equilibrium position spool 133 of tool positioner 111 is not present.

Thus, the operation of the tool positioner 111 of FIGURE 2, particularly at high frequencies, is improved over that of the tool positioner 11 of FIGURE 1. Such improvement has been produced by isolating the steady state and dynamic correction components of the error signal output from the differential amplifier and providing separate spool valves for controlling the position of the tool 113 relative to the workpiece 116 which are responsive respectively to the steady state and dynamic correction signals. This enables the dynamic spool valve to have a centered position as its zero or equilibrium position, producing flow characteristics not degraded by the off center zero or equilibrium position typical of the spool 33 of FIGURE 1.

The vibration controller of this invention may also be utilized with machine tools other than lathes. For example, the vibration controller of this invention may be utilized in conjunction with grinding apparatus of the type shown in FIGURES 4 and 4a. Grinding apparatus modified to include the vibration controller of this invention in one form preferably includes a bearing 200 rotatably supporting a motor driven shaft 201. The shaft 201 has a grinding wheel 213 mounted at its end in proximity to a workpiece 216 held between centers 217. The journal 200 at its opposite ends is provided with pairs of positioning cavities 204 and 205. The pairs of positioning cavities 204 and 205 each include upper cavities 206 and 207, respectively and lower cavities 208 and 209, respectively. The upper cavities 206 and 207 are connected jointly to one of the passages 49 and 50 of the fluid valve 11 of FIGURE 1 while the lower cavities 208 and 209 are connected to the other of the passages 49 and 50. Such a cavity connection arrangement contemplates that the relative movement between the shaft 201 and the workpiece 216 occurs in a manner such that the axes of shaft 201 and the workpiece 216 remain substantially parallel to each other.

Figure 4:
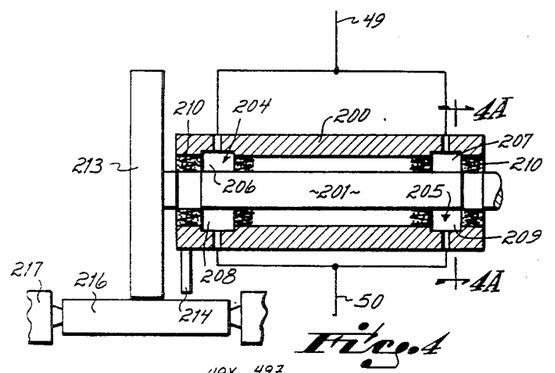
FIGURE 4 shows a portion of a grinding machine modified in a manner suitable for embodying the vibration controller of this invention.
Figure 4A:
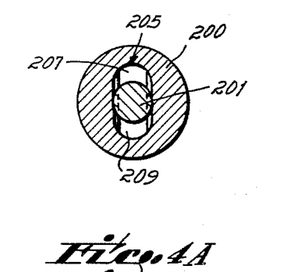
FIGURE 4a is a cross sectional view taken along line 4a—4a of FIGURE 4.

Assuming that the cavities 206 and 207 are connected to passage 49 and the cavities 208 and 209 are connected to passage 50, the cavities 206 and 207 function in the same manner with respect to the shaft 201 as the cavity 47 functions with respect to the piston 45. Likewise, the cavities 208 and 209 function with respect to the shaft 201 in the same manner as the cavity 48 functions in connection with the piston 45. Specifically, fluid entering passage 49 to the cavities 206 and 207 in conjunction with fluid leaving the cavities 208 and 209 via passage 50 is effective to displace the shaft 201 downwardly, moving the grinder 213 toward the workpiece 216. Likewise, entry of fluid into cavities 208 and 209 via passage 50 in conjunction with fluid leaving cavities 206 and 207 via passage 49 is effective to displace the shaft 201 upwardly, moving the grinding wheel 213 upwardly with respect to the workpiece 216. In accordance with well-known techniques in the bearing art, suitable flexible seals which are indicated schematically by the reference numeral 210 are provided to permit relative movement between the shaft and the journal without loss of hydraulic pressure.

A transducer 214 mounted on the journal 200 proximate the workpiece 216 functions relative to the workpiece 216 in much the same manner as the transducers 14 and 114 function with respect to the workpieces 16 and 116, respectively. Specifically, the transducer 214 provides input signals correlated to the actual depth of cut to a differential amplifier, such as the amplifier 19 of the feedback loop of FIGURE 1. This enables a comparison between the actual depth of cut and the desired depth of cut to be obtained and an error signal subsequently generated correlated to the difference between the actual and desired depths of cut. This error signal then operates a fluid valve of the type shown in FIGURE 1 for ultimately admitting and draining fluid from the passages 49 and 50 to thereby reposition the shaft 201 and, hence, the grinding wheel 213 relative to the workpiece 216 as may be necessary to control vibrations of the grinding wheel 213 and/or the workpiece 216.

Alternatively, the re-positioning of the cutter 213 relative to the workpiece 216 may be achieved by deriving steady state and dynamic correction signals from the differential amplifier output. The steady state and dynamic correction signals may then be used to drive separate fluid valves for independently controlling the fluid in cavities 206 and 209 and cavities 208 and 207, respectively. In this manner dynamic positioning of the grinding wheel 213 is effected by controlling the fluid in cavities 208 and 207, the control being exercised by the dynamic fluid valve responsive to the dynamic correction signal. Likewise, steady state positioning of the grinding wheel 213 is produced by controlling the fluid in cavities 206 and 209 with a steady state fluid valve responsive to the steady state correction signal.

Division of the differential amplifier output signal into its steady state and dynamic components produces the advantage noted earlier. Namely, flow degradation does not result at high frequencies, and thus, non-linearities in operation are avoided.

Figure 5:
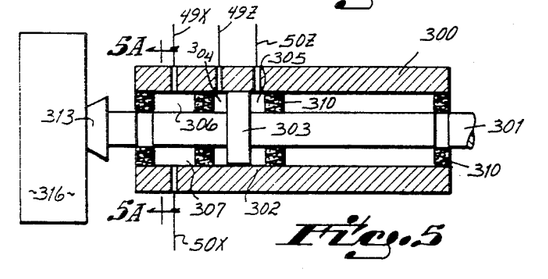
FIGURE 5 shows a portion of a milling machine modified in a manner suitable for embodying the vibration controller of this invention.
Figure 5A:
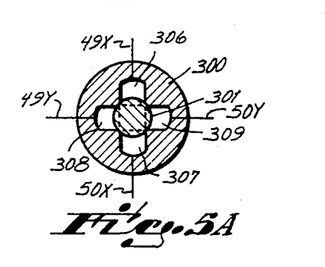
FIGURE 5a is a cross sectional view taken along line 5a—5a of FIGURE 5, FIGURES 6a and 6b show schematically the response of a conventional machine tool to a vibration-inducing force.

The vibration controller of this invention may also be utilized in conjunction with a milling machine of the type shown in FIGURES 5 and 5a. The modification of a typical milling machine necessary for implementing the use of a vibration controller of this invention preferably includes a journal 300 rotatably mounting a shaft 301 at the end of which is secured a milling cutter 313 in proximity to a workpiece 316. A piston 303 is formed on the shaft 301 at a point intermediate its ends and divides a bore 302 into two variable volume cavities 304 and 305. The cavities 304 and 305 communicate with passages 49Z and 50Z respectively.

The journal 300 also includes two orthogonal sets of positioning cavities surrounding the shaft 301. One of the cavity sets includes an upper cavity 306 and a lower cavity 307, while the other cavity set includes a left cavity 308 and a right cavity 309 as viewed in FIGURE 5a. In accordance with well-known techniques in the bearing art, suitable flexible seals which are indicated schematically by the reference numeral 310 are provided to permit relative movement between the shaft and the journal without loss of hydraulic pressure. Mounted on the journal 300 are three position transducers (not shown), namely, X, Y, and Z transducers. The X, Y, and Z position transducers are suitably located to provide three electrical signals indicative of the actual depth of cut between the cutter 313 and the workpiece 316 in the X, Y, and Z directions, respectively.

The cavities 306 and 307 are connected via passages 49X and 50X to an X valve of the type shown in FIGURE 1 and function in connection with the X transducer mounted on the journal 300 to maintain the X component of the depth of cut of the cutter 313 relative to the workpiece 316 at the desired value. Specifically, a differential amplifier compares the output of the X transducer with a desired X component depth of cut reference value, producing an X error signal correlated to the deviation in the X direction between the actual and desired depths of cut. This X error signal operates the X valve to admit or drain fluid from the cavities 306, 307 via passages 49X and 50X as is necessary to vertically shift the shaft 301 and, hence, the cutter 313 relative to the workpiece 316, thereby returning the cutter 313 to the desired X component of cut.

In like manner, the cavities 308 and 309 are connected via passages 49Y and 50Y to a second or Y valve of the type shown in FIGURE 1. The output of the Y transducer mounted on journal 300 in conjunction with a Y reference signal corresponding to the desired Y component of the depth of cut functions to actuate the Y valve in the manner necessary to maintain the cutter 313 at the desired Y depth of cut component value. That is, fluid is admitted or drained from cavities 308 and 309 via passages 49Y and 50Y in accordance with a Y error signal generated by a Y differential amplifier in response to the difference between the actual and desired depths of cut in the Y direction, thereby returning the cutter 313 to the desired Y component of depth of cut with respect to the workpiece 316.

Similarly, the cavities 304 and 305 are connected via passages 49Z and 50Z to a third or Z valve of the type shown in FIGURE 1. The Z valve is controlled by an error signal generated by a Z differential amplifier in response to the difference between the output of the Z transducer mounted on journal 300 and the desired Z component of the depth of cut, and functions to admit or drain fluid from cavities 304 and 305, positioning the piston 303 and, hence, the cutter 313 relative to the workpiece 316 as desired to return the cutter 313 to the desired depth of cut in the Z direction.

Thus, the function of the vibration controller of this invention can be duplicated or triplicated, providing simultaneous positioning motion to a tool in two or three mutually perpendicular directions, respectively. This enables vibrations to be eliminated in machines having cutting tools with differing degrees of freedom.

As those skilled in the art will appreciate, many changes and modifications may be made to the preferred embodiments described herein without departing from the spirit and scope of this invention. For example, instead of repositioning the tool, the vibration controller may reposition the workpiece, or reposition both the tool and workpiece as desired to restore the depth of cut. In the embodiments of FIGURES 4 and 5, instead of using the modified journal bearing to reposition the shaft on which the cutting tool is mounted, it is possible to use similar journals to reposition the centers between which the work is mounted, thereby repositioning the workpiece.

Also it is contemplated that the closed loop servo network of the vibration controller of this invention may be stabilized and the response characteristics enhanced by using the time rate of change of the output of the position transducer for developing the position correcting signal used to reposition the tool holder relative to the workpiece. Alternatively, a signal correlated to the time rate of change of the depth of cut may be generated for repositioning the tool relative to the workpiece by employing a velocity transducer mounted for movement with the tool. In this way, that is, by sensing the velocity of the tool relative to the workpiece along the direction of cut, a position correcting signal correlated to the time rate of change of displacement may be directly generated. It is also possible to generate a position correction signal correlated to the time rate of change of the depth of cut by mounting an acceleration transducer for movement with the tool and integrating its output thereby producing a signal correlated with velocity and, hence, with the time rate of change of the depth of cut.

It is also within the scope of this invention to use a variety of different arrangements for determining the depth of cut. For example, the depth of cut may be continously monitored by employing measuring techniques based on ultrasonic, optical, electrical, or magnetic phenomena or the like. A preferred depth of cut measuring arrangement includes a variable reluctance displacement probe, for example, a Bently probe, which is suitably referenced to provide a zero output signal when the depth of cut is zero.

It is considered to be within the scope of this invention to use tool positioners operating on principles other than hydraulics. For example, it is possible to use a magnetostrictive material for mounting the cutting tool. The position of the cutting tool can then be changed in response to a magnetic field in accordance with the well-known principles of operation of magneto-strictive materials. Similar results can be obtained with electric fields utilizing piezoelectric crystals such as Rochelle salts.

It is further contemplated and considered to be within the scope of this invention, should the servo loop be of the analogue type, that a controller be incorporated in the feedback network for the purpose of introducing signal manipulation and compensation as may be desirable to accomplish such functions as integral control, proportional derivative control and the like.

It is further considered to be within the scope of this invention to incorporate in the servo feedback loop conventional digital control techniques for processing the information derived from monitoring the relative position between the tool and workpiece at their interface, and generating the position correction signal required to shift the position of the tool relative to the workpiece as may be necessary to minimize vibratory relative motion between the tool and workpiece at their interface.

Having described the invention, what is claimed is:

1. In a machine tool having a workpiece supportable thereon and a cutting tool extending toward said workpiece, a system for maintaining a desired depth of cut between said tool and workpiece face comprising:
   reference means for producing a first output signal correlated to a desired depth of cut between said tool and said workpiece,
   monitoring means for producing a second output signal correlated to the instantaneous actual depth of cut between said tool and said workpiece,
   comparison means differentially responsive to both said first and second output signals for generating a steady state control signal correlated to the time average difference between said actual and desired depths of cut, and
   a positioning device connecting said tool and workpiece for producing relative movement therebetween, said positioning device having means responsive to said steady state control signal for relatively positioning said tool and workpiece to maintain the time average depth of cut between said tool and workpiece equal to said desired depth of cut, said positioning device having further means responsive to said dynamic control signal for relatively positioning said tool and workpiece to maintain the instantaneous difference between said constant and actual depth of cuts at substantially zero.

2. The system of claim 1 wherein said positioning device comprises:
   (a) a member confined for limited tool positioning motion in response to fluid flow,
   (b) a steady state fluid control device for controlling a first flow of fluid to said member and responsive to said steady state control signals for moving said member and in turn said tool to maintain the time average depth of cut between said tool and workpiece equal to said constant depth of cut, and
   (c) a dynamic fluid control device for controlling a second flow of fluid to said member and responsive to said dynamic control signals for moving said member and in turn said tool to maintain the instantaneous difference between said constant and actual depth of cuts at substantially zero.

3. The system of claim 2 wherein said comparison means comprises:
(a) a differential amplifier responsive to said first and second output signals for generating an error signal correlated to the instantaneous difference between said actual and desired depth of cut,
(b) a high-pass filter responsive to said error signal for generating said dynamic control signal, and
(c) a low-pass filter responsive to said error signal for generating said steady state control signal.

4. The system of claim 3 wherein said member includes a shaft having axially displaced first and second increased diameter portions slideable, respectively, in first and second bores sealed from each other, and wherein said fluid valves control fluid flow to different ones of said bores for selectively shifting said increased diameter shaft portions in response to said control signals, thereby positioning said tool.

5. The system of claim 2 wherein said member includes a driven shaft mounting said tool and wherein said shaft is confined in a bearing structure having first and second fluid chambers isolated from each other and communicating with said shaft for independently subjecting said shaft to said first and second controlled fluid flows, thereby independently providing dynamic and steady state positioning to said shaft and said tool in response to said dynamic and steady state control signals, respectively.

6. In a machine tool having a workpiece supportable thereon and a cutting tool engageable with said workpiece to effect removal of stock therefrom wherein the workpiece and/or tool are susceptive of vibration at a vibration frequency, the improvement for substantially reducing vibration-induced relative displacement between said workpiece and tool at the interface therebetween, comprising:
monitoring means for producing a signal correlated to said vibration-induced relative displacement between said workpiece and tool at the interface therebetween, and
a positioning device for producing relative movement between said tool and workpiece, said positioning device having a frequency response at least equal to said vibration frequency and being responsive to said signal for instantaneously repositioning said tool and workpiece relative to each other to substantially reduce said vibration-induced relative displacement at the interface of said tool and workpiece.

7. The improvement of claim 6 wherein said monitoring means includes
(a) reference means for producing a first output signal correlated to a desired depth of cut between said tool and workpiece,
(b) transducing means for producing a second output signal correlated to the instantaneous actual depth of cut between said tool and workpiece, and
(c) comparison means differentially responsive to said first and second output signals for producing said signal correlated to said vibration-induced relative displacement.

8. The improvement of claim 7 wherein said transducing means includes displacement sensing means for sensing said actual depth of cut.

9. In a machine tool having a base, a workpiece mounted on said base, a cutting tool mounted on said base for operative engagement with said workpiece, said tool and/or workpiece being susceptive of vibrating at a vibration frequency, the improvement for substantially reducing vibration-induced relative displacement between said workpiece and tool at the interface therebetween, comprising:
means interposed between said cutting tool and said base for varying the force between said tool and said workpiece, said force-varying means having a response frequency at least equal to said vibration frequency,
monitoring means for producing a signal correlated to said vibration-induced displacement between said tool and workpiece,
means connecting said monitoring means to said force-varying means to vary the force between said cutting tool and workpiece upon detection of vibration-induced displacement between said tool and workpiece and to instantaneously change the force between said tool and workpiece to substantially reduce the vibration-induced displacement between said tool and workpiece.

10. A machine tool having a cutting tool for removing stock from a workpiece at a specified removal rate without degradation of the workpiece finish due to vibration-induced displacement between said workpiece and tool produced by vibration of said cutting tool and/or workpiece at a vibration frequency, said machine tool comprising:
a base,
means for removing said workpiece and tool relative to each other to effect the removal of stock from said workpiece,
means interposed between said base and one of said tool and workpiece for varying the force between said tool and workpiece, said force-varying means having a response frequency at least equal to said vibration frequency,
support means mounted on said base and supporting said force-varying means, said support means being capable of deflection when said workpiece and/or tool vibrate in response to stock removal at said specified rate,
monitoring means for producing a signal correlated to said vibration-induced relative displacement between said workpiece and tool, and
means connecting said monitoring means to said force varying means to vary the application of force between said tool and workpiece upon detection of vibration-induced relative displacement between said tool and workpiece and to instantaneously change the force on said tool to substantially reduce the vibration-induced displacement between said tool and workpiece.

11. The improvement of claim 10 wherein said monitoring means includes
(a) reference means for producing a first output signal correlated to a desired depth of cut between said tool and workpiece,
(b) transducing means for producing a second output signal correlated to the instantaneous actual depth of cut between said tool and workpiece, and
(c) comparison means differentially responsive to said first and second output signals for producing said signal correlated to said vibration-induced relative displacement.

12. The improvement of claim 11 wherein said transducing means includes displacement sensing means for sensing said actual depth of cut.

13. A machine tool having a workpiece supportable thereon and a cutting tool engageable with said workpiece to effect removal of stock therefrom wherein the workpiece and/or tool are susceptive of vibrating at a vibration frequency, the improvement for substantially reducing vibration-induced relative displacement between said workpiece and tool at the interface therebetween, comprising:
a base,
monitoring means for producing a signal correlated to said vibration-induced relative displacement between said workpiece and tool at the interface therebetween,
a positioning device for producing relative movement between said tool and workpiece, said positioning device having a frequency response at least equal to said vibration frequency and being responsive to said signal for instantaneously repositioning said tool and workpiece relative to each other to substantially reduce said vibration-induced relative displacement at the interface of said tool and workpiece, and support means interposed between said base and said positioning device, said support means being capable of deflection when said workpiece and/or tool vibrate in response to stock removal at said specified rate.

14. The improvement of claim 13 wherein said monitoring means includes
   (a) reference means for producing a first output signal correlated to a desired depth of cut between said tool and workpiece, and
   (b) transducing means for producing a second output signal correlated to the instantaneous actual depth of cut between said tool and workpiece, and
   (c) comparison means differentially responsive to said first and second output signals for producing said signal correlated to said vibration-induced relative displacement.

15. The improvement of claim 14 wherein said transducing means includes displacement sensing means for sensing said actual depth of cut.

16. In a machine tool having a workpiece supportable thereon and a cutting tool extending toward said workpiece, a system for maintaining a desired depth of cut between said tool and workpiece face comprising:
   reference means for producing a first output signal correlated to a desired depth of cut between said tool and said workpiece,
   monitoring means for producing a second output signal correlated to the instantaneous actual depth of cut between said tool and said workpiece,
   comparison means differentially responsive to both said first and second output signals for generating an error signal having a steady state signal component correlated to the time average difference between said actual and desired depths of cut and a dynamic signal component correlated to the instantaneous difference between said actual and desired depths of cut, and
   a positioning device connecting said tool and workpiece for producing relative movement therebetween, said positioning device being responsive to said error signal components for relatively positioning said tool and workpiece to maintain the time average depth of cut between said tool and workpiece equal to said desired depth of cut and to maintain the instantaneous difference between said desired and actual depths of cut at substantially zero.

17. The method of suppressing vibration between a relatively moving tool and workpiece having a preselected relative position therebetween comprising the steps of:
   monitoring the vibration-induced displacement between the tool and workpiece, and
   applying a force between said tool and workpiece in response to said monitoring to resist further displacement and to return said tool and workpiece to said preselected position.

18. The method of suppressing vibration between a relatively moving tool and workpiece having a preselected relative position therebetween comprising the steps of:
   monitoring the vibration-induced displacement between the tool and workpiece, and
   repositioning said tool and workpiece relative to each other to restore said preselected relative position therebetween and thereby substantially reduce said vibration-induced displacement.

References Cited

UNITED STATES PATENTS

| | | | |
|---|---|---|---|
| 2,927,258 | 3/1960 | Lippel | 90—13.99 |
| 2,940,224 | 6/1960 | Madrich | 51—165 |
| 3,001,336 | 9/1961 | Bauer | 51—165 |
| 3,065,578 | 11/1962 | Royston | 51—165 |
| 3,095,532 | 6/1963 | Floyd | 90—13.99 |
| 3,143,041 | 8/1964 | Katz | 90—13.99 |
| 3,217,568 | 11/1965 | De Graffenried | 77—3 |
| 3,244,029 | 4/1966 | Jacobson | 77—3 |
| 3,274,738 | 9/1966 | Kuniholm | 51—165 |
| 3,313,581 | 4/1967 | Kusakabe | 51—165 |
| 3,330,634 | 7/1967 | Rae | 51—165 |

FOREIGN PATENTS 1,000,204   8/1965   Great Britain.

GERALD A. DOST, Primary Examiner

U.S. Cl. X.R.

51—165; 82—14